United States Patent Office 3,546,308
Patented Dec. 8, 1970

1

3,546,308
ALKYLATION OF HYDROXYADAMANTANES
Robert E. Moore, Wilmington, Del., assignor to Sun Oil Company, Philadelphia, Pa., a corporation of New Jersey
No Drawing. Filed Mar. 17, 1969, Ser. No. 807,946
Int. Cl. C07c 3/54, 13/28
U.S. Cl. 260—666                                    17 Claims

ABSTRACT OF THE DISCLOSURE

The process for the alkylation of adamantane compounds with $C_4$-$C_{30}$ alcohols and olefins is improved to give greatly increased yields in relatively short reaction times, i.e., 10–60 minutes, by employing a bridgehead hydroxadamantane as the material to be alkylated. For example, 3,5-dimethyl-1-adamantane was reacted with a 1:1 mole ratio of isopropanol in 96% concentrated $H_2SO_4$ at 10–25° C. for 15 minutes to give a yield of 63 weight percent of 1-n-propyl-3,5-dimethyladamantane. The prior art process employing 3,5-dimethyladamantane in a somewhat similar procedure gave a yield of 12.6 weight percent 1-n-isopropyladamantane after 30 minutes reaction. At acid concentrations in the range of 80 to 94% only the $C_3$ agent produces alkenylation to give 1-(3,5-dimethyladamantyl) propene.

---

This invention relates to the alkylation of hydroxyadamantanes. More particularly hydroxyadamantanes having 10 to 30 carbon atoms including adamantane per se and substituted adamantanes such as alkyl-, cycloalkyl-, and aryl-adamantanes are converted by alkylation to adamantanes having one or more saturated hydrocarbon substituents at bridgehead positions than the starting material.

Adamantane (tricyclo [$3.3.1.1^{3,7}$]decane) has a carbon structure containing ten carbon atoms arranged in a completely symmetrical, strainless manner which is often described as a cage-like structure consisting of three condensed cyclohexane rings. There are four bridgehead carbon atoms which are equivalent to each other as are the rings. The adamantane structure is often depicted by:

The preparation of methyl- and/or ethyl-substituted adamantanes by the isomerization of tricyclic naphthenes by means of an aluminum halide or HF—$BF_3$ catalyst has been described in several references including the following: Schneider U.S. Pat. No. 3,128,316; Janoski et al. U.S. Pat. No. 3,275,700; Schleyer et al., Tetrahedron Letters No. 9, pps. 305–309 (1961); and Schneider et al., JACS, vol. 86, pps. 5365–5367 (1964). The isomerization products can have the methyl and/or ethyl groups attached to the adamantane nucleus at either bridgehead or non-bridgehead positions or both, although completion of the isomerization reaction favors bridgehead substitution.

Preparation of adamantane hydrocarbons having higher alkyl groups has been disclosed by Spengler et al., Erdol und Kohle-Erdgas-Petrochemie, vol. 15, pps. 702–707 (1962). These authors used a Wurtz synthesis involving the reaction of 1-bromoadamantane with alkali metal alkyls to interchange the alkyl group for the bromine substituent. In this manner 1-n-butyladamantane and 1-n-hexyladamantane were prepared.

Hoek et al., 85 (1966) Recueil 1045–1053, have de-

2 scribed a different route for the preparation of butyl-substituted adamantane. A rather complicated procedure was developed, which involved reacting bromoadamantane with thiophene using $SnCl_4$ as catalyst in the presence of excess thiophene as solvent to produce adamantylthiophene and then hydrogenating the adamantylthiophene to yield butyl-substituted adamantanes.

Recently Schneider has disclosed a process in U.S. Pat. 3,382,288 issued May 7, 1968, for the alkylation of admantane hydrocarbons with an olefin or alcohol in the presence of concentrated $H_2SO_4$ or HF at a temperature in the range of −20 to 100° C.

The present invention has found higher yields of alkylated adamantanes and shorter reaction times can be obtained if a hydroxyadamantane is used instead of an adamantane hydrocarbon with concentrated sulfuric acid and the alkylating agent.

Briefly stated the present invention is a process for the alkylation of an adamantane compound having at least one hydroxyl bridgehead substituent comprising contacting said hydroxyadamantane compound with an alkylating agent having 3–30 carbon atoms selected from the group consisting of aliphatic monoolefins and alcohols and cycloaliphatic monoolefins and alcohols in the presence of sulfuric acid at an alkylating concentration at an alkylating temperature in the range of −20 to 100° C. and recovering an alkylated adamantane product having at least one more bridgehead alkyl or cycloalkyl substituent than the starting adamantane compound.

The reaction proceeds, it is believed, through a carbonium ion which can be depicted by the reaction:

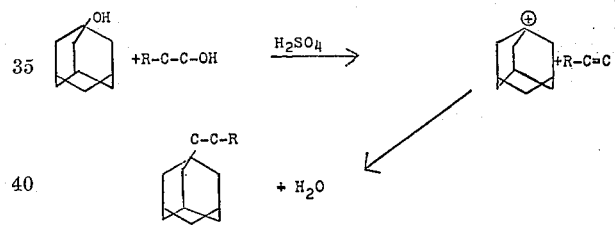

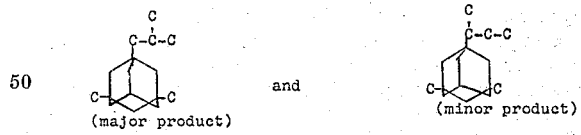

This mechanism is overly simplified for the purpose of illustration. For example, the alkylation of 3,5-dimethyl-adamantane-1-ol with 1-butanol results in two products, i.e., Substantially the same result is achieved with sec-butyl alcohol or t-butyl alcohol. The use of higher aliphatic alcohols or olefins results in similar branched alkyl substituents even though the original alkylating agent may not have been branched. As the number of carbon atoms in the alkylating agent chain increases so does the complexity and number of possible isomers. Primary and secondary alcohols and olefins are not as susceptible to side reactions and are preferred over tertiary alcohols and olefins.

The higher cycloaliphatic alcohols or olefins ($C_6$ and above) are similarly subject to considerable side reaction.

The prior discussion has been limited to a consideration of monoalkylation. Polyalkylation can be achieved according to the present invention. The extent of alkylation possible is in the first instance limited by the number of bridgehead carbon atoms unsubstituted by hydrocarbon radicals. For example, 3,5-dimethyladamantane-1-ol has only two bridgehead carbon atoms available for alkylation. It is possible to alkylate both available positions in that compound although the second alkylation is far more difficult. Generally the yields of polyalkylation of the adamantane monol are quite low. This is principally due to the fact that the second alkylation must proceed as in the previously mentioned Schneider application, that is, after the first alkylation the adamantane compound is equivalent to the Schneider compound at that point.

It is preferable that the adamantane starting material be a diol such as 1,3-adamantane diol or 5,7-dimethyl 1,3-adamantane diol where polyalkylation is desired. In the case of dialkylation, the reaction will proceed rapidly with the diol. Generally there will be no advantage to alkylation beyond the di-stage, moreover, alkylations beyond this point are extremely difficult, even starting with the diol of adamantane and yields are disappointingly low.

The preparation of the monol of adamantane is described J. Org. Chem., vol. 26, pages 2207–2212 (1961); U.S. 3,356,739; and U.S. 3,356,740. The preparation of the diol of adamantane is shown in U.S. 3,356,741 and U.S. 3,383,424 issued May 14, 1968. A particularly suitable adamantane starting material for the present process can be described as a hydroxyadamantane having 1 to 2 bridgehead hydroxyl radicals, 0 to 9 hydrocarbon radicals having 1–10 carbons atoms each selected from the group consisting of alkyl, cycloalkyl, and aryl, preferably there are 0 to 3 alkyl radicals having 1 to 2 carbon atoms each. Some preferred materials are the 1-ol of adamantane, methyladamantane, ethyladamantane, dimethyladamantane, ethylmethyladamantane, diethyladamantane, triethyladamantane, and trimethyladamantane. The hydrocarbon substituents can contain branched groups; however, tertiary hydrogen atoms in the substituents are not desirable since these will complete in the reaction and contribute to lower yields of the desired products and a more complex reaction product.

The acid employed in this alkylation is concentrated sulfuric in the range of 80–100% strength, preferably 85–99% $H_2SO_4$. A volume excess of acid to the hydroxyadamantane is preferred. Generally a volume ratio of 1:1 to 20:1 is used.

An interesting and totally unexpected discovery was made in regard to propane and n-propanol or isopropanol at $H_2SO_4$ strengths of less than 95% more specifically 80–94%. Instead of alkylation the result is alkenylation. The product is a 1-adamantyl propene.

The mole ratio of $C_3$ alkenylating agent to the hydroxyadamantane significantly effects the yields of alkenylated product. An excess of isopropanol, for example, is preferred. A mole ratio of alkenylating agent to hydroxyadamantane compound in the range of 2:1 to 20:1 is suitable. The alkenylation is carried out at a temperature in range of 20–100° C., preferably 50–80° C.

All of the other alkylating agents previously described, i.e., aliphatic and cycloaliphatic olefins and alcohols of $C_4$–$C_{30}$ undergo alkylation. At $H_2SO_4$ acid strength of greater than 14% propene and propanol also produce only alkylation. The 1-adamantyl propene can be hydrogenated by conventional methods, for example, platinum-on-alumina catalyst, hydrogen at 1000 p.s.i.g. and a temperature of 650° F., to give the 1-propyladamantane. The 1-adamantyl propene can be oxidized to yield a tertiary alcohol, 1-adamantyl-1-hydroxypropene which is a relatively inert solvent. The 1-adamantyl propenes can, of course, be employed in the process of the present invention.

A preferred manner of practicing the process comprises first mixing the adamantane starting material with the $H_2SO_4$.

Preferred reaction temperatures vary depending upon the type of alkylating agent used. For $C_3$ and higher unbranched olefins and non-tertiary alcohols a temperature in the range of 10° or 15° up to 50° C. is preferred, while for branched olefins and tertiary alcohols a temperature in the range of 0° up to 40° or 50° C. is preferred. Addition of the alkylating agent and agitation of the mixture are continued until the optimum degree of alkylation of the adamantane hydrocarbon has been attained. Even for monoalkylation more than .5 mole of alkylating agent per mole of adamantanol should be used, typically 1.0 to 2.0 mole/mole of adamantol.

After the reaction is completed, the reaction mixture is settled to separate the hydrocarbon and acid phases. The hydrocarbon phase can be washed to remove any residual acid and then distilled to separately recover products and any unreacted starting hydrocarbon therefrom.

An equivalent procedure for carrying out the alkylation comprises adding to the emulsion of adamantane hydrocarbon in acid an alkyl or cycloalkyl sulfate previously prepared or obtained in any suitable manner. This amounts to adding the olefin in the form of its sulfate and gives essentially the same results. Other types of equivalent alkylating agents are alkyl or cycloalkyl ethers and esters. For example, the same butyl olefin would be produced from dibutyl ether or from butyl acetate as from $C_4$ olefins, alcohols or sulfates, and hence the same alkylation products can be obtained from these with adamantane alcohols.

Still another procedure, which can be used when the alkylating agent is an unbranched olefin or a primary or secondary alcohol, is first adding all of the alkylating agent to the acid at a relatively low temperature, e.g., 0° C., to form the alkyl or cycloalkyl sulfate, followed by adding all of the adamantane alcohol to form a homogeneous solution. With such alkylating agents substantial alkylation does not take place at 0° C. The temperature of the emulsion is then increased slowly while stirring the mixture and the alkylation reaction begins to proceed. For $C_4$ and higher secondary alcohols and internal olefins a substantial rate of alkylation is attained by the time a temperature of 15° C. is reached, whereas primary alcohols and terminal olefins (also $C_4$ or higher) generally require a somewhat higher temperature, e.g., 25° C. The mixture is stirred at such reaction temperature level until all of the alkylating agent has been consumed, and the mixture is then worked up to separate the alkylated adamantane product.

Illustrative examples of olefins which can be used in the process are the following: propylene; butene-1; butene-2; isobutylene; octene-1; octene-4; 2,2,3,-trimethyl-3-butene; diisobutylenes; dodecenes; docosenes; 5,5-diethyl-decene-3; cyclobutene; cyclopentene; methylcyclohexenes; dimethylcyclohexenes; ethylcyclohexenes; vinylcyclohexane; ethylidenecyclohexane; 1-adamantyl propene; 1,4-dicyclopentylbutene-2; 1,2-dicyclohexylethylene; 20-cyclohexyleicosene-1; $\Delta^9$-octalin; $\Delta^1$-octalin; methyloctalins; dihydrodicyclopentadienes; and the like. Some examples of alcohols that can be used, other than those previously mentioned, are: amyl alcohols; 1-octanol; 2-octanol; 5-decanol; 2-ethyl-2-dodecanol; 1-methylcyclohexanol; cis- or trans-decalols with the hydroxy group in the 1-, 2- or 9-positions; methyldecalols; 3-methylcyclohexanol; 1-cyclohexylcyclohexanol; dicyclopentylmethanol; 1,2-dicyclohexylethanol; tricyclohexylmethanol; and the like. Generally olefins and alcohols having 10 or less carbon atoms are preferred in the invention.

The following examples are presented to illustrate the invention:

EXAMPLE 1

Reaction of sec-butanol with 3,5-dimethyladamantane (DMA)

To an emulsion of 20 ml. of 96% $H_2SO_4$ and 5.0 g. of 3,5-dimethyladamantanol was added by stirring a blend of 5.16 g. of DMA and 1.27 g. of sec-butyl alcohol at about 4° C. for over five minutes. The molar ratio of total DMA to alcohol was 3.6. The mixture was then stirred for a total of 46 minutes while slowly raising the temperature to about 32° C. Analysis of the final product is shown in Table I. In addition to the product shown a small amount of low boiling paraffins was formed but is not included in the data given.

TABLE 1

|  | Wt. percent |
|---|---|
| DMA | 73.3 |
| 1-isobutyl-3,5-dimethyladamantane | 12.3 |
| 1-sec-butyl-3,5-dimethyladamantane | 6.7 |
| 1-$C_5$ DMA's | 0.1 |
| 1,3-di-$C_4$-DMA I | 1.4 |
| 1,3-di-$C_4$-DMA II | 2.4 |
| 1,3-di-$C_4$-DMA III | 1.3 |
| 1-$C_8$ DMA's | 0.4 |
| Di-DMA-butanes | 2.1 |

EXAMPLE 2

Reaction of sec-butanol with 3,5-dimethyl-1-adamantanol

To a reaction vessel was charged 250 ml. of cold (~10° C.) 85% $H_2SO_4$ followed by rapid addition of sec-butanol (130 ml). with good stirring. To this reaction mixture was added 18.0 g. (0.1 mole) 3,5-dimethyl-1-adamantanol. The reaction was stirred for ~5 minutes at 10–15° C. then heated to 70° C. A clear supernatant hydrocarbon layer formed in about 10 minutes. A sample analyzed via g l pc had the following alkylate composition:

|  | Percent |
|---|---|
| 1-sec-butyl-3,5-dimethyladamantane | 26 |
| 1-iso-butyl-3,5-dimethyladamantane | 46 |

EXAMPLE 3

Reaction of isopropanol with 3,5-dimethyladamantane

An emulsion of 20 ml. of 96% $H_2SO_4$ and 5.00 g. of DMA was stirred at about 5° C. and a blend of 5.00 of DMA with 1.00 g. of isopropanol was added over 13 minutes time. Molar ratio of total DMA to isopropanol was 3.65. Stirring was continued with temperatures and times of sampling as shown in Table II.

TABLE II

| Cut No | 1 | 2 |
|---|---|---|
| Temperature, °C | 5-23 | 35 |
| Incremental time, min | 27 | 30 |
| Composition, wt. percent: |  |  |
| DMA | 95.7 | 84.6 |
| 1-n-propyl-DMA | 3.8 | 12.6 |
| 1,3-di-n-propyl-DMA | 0.1 | 0.6 |
| 1-hexyl DMA's | Trace | 0.1 |
| Di-DMA-propane | 0.5 | 2.0 |

EXAMPLE 4

Reaction of isopropanol with 3,5-dimethyl-1-adamantanol

To a reaction vessel containing 180 cc. of cold (~10° C.) 96% $H_2SO_4$ was charged 3,5-dimethyl-1-adamantanol (18.0 g., 0.1 mole) with stirring. After the DMA-OL was completely dissolved isopropanol (6.0 g., 0.1 mole) was added and the reaction mixture stirred till it had warmed to room temperature (approximately 15 minutes 225° C). The hydrocarbon layer, which was shown by V.P.C. to contain 63% 1-n-propyl-3,5-DMA, was separated, washed with 10% sodium carbonate solution, dried, and distilled to remove volatile components (solvent and DMA). The residue was distilled under reduced pressure to obtain 1-n-propyl-3,5-dimethyladamantane (boiling point of 255° C. at 760 mm.).

EXAMPLE 5

Reaction of cyclopentanol with 3,5-dimethyladamantane

To a stirred emulsion of 10 ml. of 96% $H_2SO_4$ and 2.50 g. of DMA was added a blend of 2.50 g. of DMA and 1.00 g. of cyclopentanol at 4-5° C. during 8 minutes time. The molar ratio of DMA to cyclopentanol was 2.63. The mixture was then stirred for 20 mintues while being warmed to 32° C. and Cut 1 was taken. The acid layer appeared orange at this time. The mixture was then stirred at 32° C. for 174 additional minutes and Cut 2 was taken. The final acid layer appeared brown.

TABLE III

|  | Weight percent | |
|---|---|---|
|  | Cut 1 | Cut 2 |
| Decalin (cis and trans) | 1.5 | 2.0 |
| DMA | 81.4 | 80.8 |
| $C_{15}$ product [1] | 0.3 | 0.5 |
| 1-cyclopentyl DMA | 15.0 | 14.6 |
| 1,3-dicyclopentyl DMA | 1.4 | 1.5 |
| Decalyl DMA [2] | 0.4 | 0.7 |

[1] Speculated to be $C_{15}$ tricyclic naphthene.
[2] Speculated structure.

EXAMPLE 6

Reaction of cyclopentanol with 3,5-dimethyl-1-adamantanol

DMA-OL (18.0 g., 0.1 mole) was dissolved in 200 cc. of cold (210° C.) 90% $H_2SO_4$ followed by the slow addition of cyclopentanol (40 cc). The resulting reaction mixture was stirred for 45 minutes and worked up as Example 4. The hydrocarbon layer contained 64% 1-cyclopentyl-3,5-dimethyladamantane (by V.P.C. analysis).

EXAMPLE 7

Reaction of cyclohexanol with 3,5-dimethyladamantane

To an emulsion of 20 ml. of 96% $H_2SO_4$ and 2.50 g. of DMA was added dropwise 0.40 g. of cyclohexanol over a period of 15 minutes while holding the temperature at 0° C. The mixture was then warmed to 32° C. and stirred for 47 minutes to obtain Cut 1, followed by continued stirring for 69 minutes more at 32° C. to obtain Cut 2. The molar ratio of DMA to cyclohexanol was 3.82. Results are shown in Table IV.

EXAMPLE 8

Reaction of cyclohexanol with 3,5-dimethyl-1-adamantanol

DMA-OL (18.0 g., 0.1 mole) was dissolved in 200 cc. of cold (~10° C.) 85% $H_2SO_4$ followed by the slow addition of cyclohexanol (50 cc.). After ten minutes, the hydrocarbon layer contained 80% 1-cyclohexyl-3,5-dimethyladamantane (by V.P.C.). The reaction conditions and yields of alkylated adamantanes are summarized in Table V.

Examples 1, 3, 5, and 7 are presented for comparison with the process of the instant invention. It can be readily seen from Table V wherein the results are summarized that the instant process produces higher yields in shorter reaction periods.

TABLE IV

|  | Weight percent | |
|---|---|---|
|  | Cut 1 | Cut 2 |
| $C_4$, $C_5$, $C_6$ paraffins | Trace | Trace |
| Methylcyclopentane | 2.1 | 2.7 |
| Cyclohexane | 0.6 | 0.1 |
| Methylcyclohexane | 1.0 | 1.1 |
| Dimethylcyclohexane | 1.1 | 1.1 |
| $C_9$ monocyclic naphthenes | 0.8 | 0.9 |
| $C_{10}$ monocyclic naphthenes | 0.3 | 0.2 |
| DMA | 76.0 | 75.7 |
| Dimethyldecalins | 3.8 | 3.7 |
| 1-methylcyclopentyl DMA I [1] | 5.3 | 5.0 |
| 1-methylcyclopentyl DMA II | 0.4 | 0.4 |
| 1-cyclohexyl DMA | 7.0 | 7.1 |
| Dimethyldecalin-DMA [2] | 1.1 | 1.2 |
| Di-DMA-$C_6$ monocyclic naphthenes [2] | 0.7 | 0.7 |

[1] Indicated to be
[2] Speculative structures.

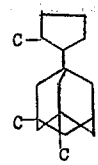

TABLE V

| Example | Temp., °C. | Conc. of H₂SO₄ | Reaction time, min. | Moles of alcohol per mole of AD compound | Yield alkylation product, wt. percent |
|---|---|---|---|---|---|
| Sec-butylalcholol: | | | | | |
| 1. DMA | 4–32 | 96 | 46 | .28 | 19.0 |
| 2. DMA-OL | 10–70 | 85 | 15 | 17.0 | 72.0 |
| Isopropanol: | | | | | |
| 3 | 5–35 | 96 | 30 | .27 | 12.6 |
| 4 | 10–25 | 96 | 15 | 1.0 | 63 |
| Cyclopentanol: | | | | | |
| 5 | 4–32 | 96 | 194 | .38 | 14.6 |
| 6 | 10 | 90 | 45 | 4.5 | 64.0 |
| Cyclohexanol: | | | | | |
| 7 | 0.32 | 96 | 116 | .26 | 7.1 |
| 8 | 10 | 85 | 10 | 5.0 | 80.0 |

EXAMPLE 9

A 25 ml. Erlenmeyer flask containing 18 cc. of 90% H₂SO₄ was charged with 1.8 g. (.01 mole) of 3,5-dimethyl-1-adamantol. To this solution 5 cc. (.062 mole) of isopropanol was added with stirring at room temperature (mole ratio isopropanol:DMA-OL 6.2:1). This mixture was then heated on a steam bath at 75° C. with intermittent stirring. In about one hour a clear supernatant layer formed. After heating for an additional two hours the reaction mixture was poured into ice water, extracted with ether and analyzed via VPC, IR, mass spectra and NMR, all of which confirmed the presence of 1-3,5-dimethyladamantylpropene in 78% yield. No other product was identified, particularly no alklation product.

The alkylated adamantane hydrocarbons resulting from the present invention are useful as the base material from which novel and beneficial derivatives can be prepared, for example, alcohols, diols, acids, diacids, amines, isocyanates, haloadamantanes, which are in turn used to prepare pharmaceuticals, pesticides, lubricants, solid polymers and the like. For example, see commonly assigned U.S. 3,398,165 issued Aug. 20, 1968 (lubricants); U.S. Ser. No. 586,825, filed Oct. 14, 1966 (polyesters); U.S. Ser. No. 542,229, filed Apr. 13, 1966 (polyamides) and U.S. Ser. No. 597,885, filed Nov. 30, 1966 (pharmaceutical).

The invention claimed is:

1. A process for the alkylation of an adamantane compound having at least one hydroxyl bridgehead substituent comprising contacting said hydroxyadamantane compound with an alkylating agent having 3–30 carbon atoms selected from the group consisting of aliphatic monoolefins and alcohols and cycloaliphatic monoolefins and alcohols in the presence of sulfuric acid at an alkylating concentration in the range of 80–100% at an alkylating temperature in the range of −20 to 100° C. and recovering an alkylated adamantane product having at least one more bridgehead alkyl or cycloalkyl substituent than the starting adamantane compound.

2. The process according to claim 1 wherein the H₂SO₄ concentration is in the range of 80–100% for alkylating agents having 4–30 carbon atoms and 95–100% for alkylating agents having 3 carbon atoms.

3. The process according to claim 1 wherein the H₂SO₄ concentration is in the range of 85–99%.

4. The process according to claim 1 wherein the temperature is in the range of 0–50° C.

5. The process according to claim 4 wherein the H₂SO₄ concentration is in the range of 85–99%.

6. The process according to claim 1 wherein the adamantane compound is a hydroxyadamantane having 1 to 2 bridgehead hydroxyl radicals, 0 to 9 hydrocarbon radicals having 1–10 carbon atoms each selected from the group consisting of alkyl, cycloalkyl and aryl.

7. The process according to claim 6 wherein there are 0 to 3 alkyl radicals having 1 to 2 carbon atoms each.

8. The process according to claim 7 wherein the adamantane compound is the 1-ol of an adamantane selected from the group consisting of adamantane, methyl adamantane, ethyladamantane, dimethyladamantane, ethylmethyladamantane, diethyladamantane, trimethyladamantane and triethyladamantane.

9. The process according to claim 8 wherein the H₂SO₄ concentration is in the range of 85–99% and the alkylating agent has 3–10 carbon atoms.

10. The process according to claim 9 wherein the hydroxyadamantane is 2,3-dimethyl-1-adamantanol.

11. A process for the alkenylation of an adamantane compound having at least one hydroxyl bridgehead substituent comprising contacting said hydroxyadamantane compound with an alcohol or olefin having 3 carbon atoms in the presence of sulfuric acid at an alkenyling concentration in the range of 85–94% at a temperature in the range of 20–100° C. and recovering an alkenylated adamantane product having at least one bridgehead propenyl radical.

12. The process according to claim 11 wherein the mole ratio of alkenylating agent to the hydroxyadamantane is in the range of 2:1 to 20:1.

13. The process according to claim 12 wherein the temperature is in the range of 50–80° C.

14. The process according to claim 11 wherein the adamantane compound is a hydroxyadamantane having 1 to 2 bridgehead hydroxyl radicals, 0 to 9 hydrocarbon radicals having 1–10 carbon atoms each selected from the group consisting of alkyl, cycloalkyl and aryl.

15. The process according to claim 14 wherein there are 0 to 3 alkyl radicals having 1 to 2 carbon atoms each.

16. The process according to claim 15 wherein the adamantane compound is the 1-ol of an adamantane selected from the group consisting of adamantane, methyladamantane, ethyladamantane, dimethyladamantane, ethylmethyladamantane, diethyladamantane, trimethyladamantane and triethyladamantane.

17. The process according to claim 11 wherein the hydroxyadamantane is 3,5-dimethyl-1-adamantanol.

References Cited

UNITED STATES PATENTS

| | | | |
|---|---|---|---|
| 3,255,268 | 6/1966 | Suld | 260—666 |
| 3,382,288 | 5/1968 | Schneider | 260—666 |
| 3,433,844 | 3/1969 | Capaldi | 260—666 |

DELBERT E. GANTZ, Primary Examiner

V. O'KEEFE, Assistant Examiner